United States Patent [19]
Lewis et al.

[11] Patent Number: 5,688,155
[45] Date of Patent: Nov. 18, 1997

[54] CARBON—CARBON COMPOSITES CONTAINING POORLY GRAPHITIZING PITCH AS A BINDER AND/OR IMPREGNANT

[75] Inventors: Irwin Charles Lewis, Strongsville; Ronald Albert Howard, Brook Park, both of Ohio

[73] Assignee: UCAR Carbon Technology Corporation, Danbury, Conn.

[21] Appl. No.: 377,467

[22] Filed: Jan. 24, 1995

Related U.S. Application Data

[62] Division of Ser. No. 790,236, Oct. 22, 1985, Pat. No. 5,413,738.

[51] Int. Cl.$^6$ .............................. B32B 9/00; B32B 31/20; B32B 31/26; C04B 35/532
[52] U.S. Cl. .................. 442/179; 208/44; 264/29.1; 264/29.3; 264/105; 428/408
[58] Field of Search ..................... 252/502, 510; 204/234; 429/217; 264/29.1, 29.3; 428/408, 489; 442/179

[56] References Cited

U.S. PATENT DOCUMENTS

| | | | |
|---|---|---|---|
| 2,527,596 | 10/1950 | Shea, Jr. et al. | 264/29.1 X |
| 3,004,862 | 10/1961 | Winslow | 428/408 |
| 3,092,437 | 6/1963 | Carter et al. | 264/29.1 |
| 3,280,042 | 10/1966 | Bannikov | 252/508 |
| 3,505,090 | 4/1970 | Pinchbeck | 106/284 |
| 4,066,737 | 1/1978 | Romovacek | 423/447 |
| 4,188,279 | 2/1980 | Yan | 204/294 |
| 5,413,738 | 5/1995 | Lewis et al. | 252/502 |

OTHER PUBLICATIONS

Chemical Changes During the Mild Air Oxidation of Pitch, J.B. Barr and I.C. Lewis, Carbon vol. 16, pp. 439–444 (1978).

Chemistry of Carbonization, I.C. Lewis, Carbon vol. 20, No. 6, pp. 519–529 (1982).

Review—Science and Technology of Graphite Manufacture, S. Ragan and H. Marsh, Journal of Materials Science, pp. 3161–3176 (1983).

*Primary Examiner*—Richard D. Lovering
*Attorney, Agent, or Firm*—Frederick J. McCarthy

[57] ABSTRACT

A unitary composite structure having improved flexural strength and a reduced coefficient of thermal expansion comprising a heterogeneous combination of a carbonaceous reinforcing material interbonded with a matrix material, wherein the said matrix material is a poorly graphitizing carbonaceous pitch containing polymerized and cross-linked aromatic components is disclosed. Graphite electrodes comprised of the poorly graphitized pitch matrix material acting as a binder and/or an impregnant are also disclosed. Processes for the preparation of the poorly graphitizing pitch, the composite structure, and particularly the graphite electrodes are disclosed as well.

4 Claims, No Drawings

CARBON— CARBON COMPOSITES CONTAINING POORLY GRAPHITIZING PITCH AS A BINDER AND/OR IMPREGNANT

This application is a Division of prior U.S. application: Ser. No 06/790,236 Filing Date Oct. 22, 1985, now U.S. Pat. No. 5,413,738.

BACKGROUND OF THE INVENTION

1. Field of the Invention

This invention pertains to the field of carbon-carbon composites and is most applicable to graphite electrodes. More specifically, the present invention relates to a poorly graphitizing pitch and carbon-carbon composites containing such pitch in the form of a binder, an impregnant, or both, which composites have improved flexural strength and reduced coefficients of thermal expansion.

2. Discussion of Related Art

Carbon-carbon composites are well known and have found commercial use in many different applications in the aerospace, chemical, electrical, metallurgical, nuclear, and other industries.

The popularity of these composites can be attributed to their good mechanical properties as well as their ability to withstand extremely high temperatures and pressures.

A short description of various patents relating to carbon-carbon composites and their applications is set forth in a book entitled "Carbon and Graphite Fibers" edited by Marshall Sitting and published by Noyes Data Corp., New Jersey (1980). In a book entitled "Technology of Carbon and Graphite Fiber Composites" by John Delmonte, published by Van Nostrand & Reinhold Company, New York (1982), a review of the technology of carbon-carbon composites is set forth. Processes for producing such carbon-carbon composites are discussed in the book entitled "Handbook of Composites", Vol. 4, edited by A. Kelly and S. T. Mileiko, published by Elsevier Science Publishers B. V., Holland (1983).

Generally, a carbon-carbon composite comprises a heterogeneous combination of carbon reinforcing material interbonded with a carbon matrix material. The carbonaceous reinforcing material can comprise carbon or graphite fibers, carbon or graphite particles, and combinations thereof. The carbon matrix material can be derived from pitch, organic resin, the thermal pyrolysis of a carbon-bearing vapor, and combinations thereof. As used herein, the term "carbon matrix material" or more simply "matrix material" or "matrix" is understood to mean a material which acts as a binder, an impregnant, or both in the context of a carbon-carbon composite where such matrix material is interbonded with a carbon reinforcing material.

There are two general methods in the prior art for the production of a carbon-carbon composite. One such method entails the chemical vapor deposition of carbon onto a structure defined by carbonaceous reinforcing material. Typically, the carbonaceous reinforcing material comprises carbon felt, woven carbon fibers, or the like, and the matrix is carbon deposited from the thermal pyrolysis of a carbon-bearing gas.

The other general method for producing a carbon-carbon composite comprises fabricating a heterogeneous combination of carbonaceous reinforcing material and a pitch or an organic resin and, thereafter, subjecting this combination to a heat treatment in an inert atmosphere at a temperature of at least about 500° C. to decompose the pitch or organic resin and thereby leave behind a carbonaceous residue bonded to the carbonaceous reinforcing material.

The fabrication or the heterogeneous combination is accomplished by adding the pitch or organic resin to the reinforcing material at a temperature at which the pitch or resin is in a liquid state so that it can wet the carbonaceous reinforcing material and infiltrate into and throughout this material and act as a binder therefor.

The heat treatment to decompose the pitch or organic resin is usually referred to in the art as "carbonization". The carbonaceous residue arising from the decomposed pitch or resin is sometimes referred to in the art as a "char". When pitch is used, the carbonaceous residue is generally referred to as a "coke". In order to interbond the matrix material with the reinforcing material, the carbon-carbon composite structure must at least be subjected to a carbonization heat treatment.

Depending upon the particular end use of the carbon-carbon composite that is being prepared, the carbonized composite may then be subjected to yet an additional heat treatment step. In this further heat treatment step, usually referred to in the art as "graphitization", the composite is heated to a temperature of at least 2600° C. to cause the carbon atoms in the filler and in the binder to orient into a graphite lattice configuration. This ordering process produces graphite with its intermetallic properties that make it useful for many applications.

In the production of a graphite electrode, which is a specific form of carbon-carbon composite, coke filler particles are mixed with a pitch binder which pitch is at a temperature such that it is in its liquid state thereby uniformly dispersing the particulate filler and allowing the desired article to be formed in a subsequent extrusion or molding step. After being formed, the "green electrode", as it is commonly known in the art, is then subjected to a first heat treatment step which is known as "baking" in the electrode art but which is substantially similar to the "carbonization" step discussed earlier. In this step, the thermoplastic pitch binder is converted to solid coke. The graphitized electrode is then formed by subjecting the baked electrode to a temperature or about 2600° C. to 3000° C. for a period of about 0.5 to 20 hours.

In the production or carbon-carbon composites, particularly graphite electrodes, one of the fundamental objectives is to obtain a composite having a high density and correspondingly low porosity. Relatively high porosity in a composite leads to an undesirable concomitant loss in both strength and other mechanical properties.

Porosity in a carbon-carbon composite generally arises as a result of volatilization of the low molecular weight components or either the pitch or the organic resin primarily during carbonization or baking and to some extent during graphitization. The coke yield of a pitch binder is generally about 40 to about 60 percent by weight after a heat treatment to about 500° C. at atmospheric pressure. This yield declines slightly as the temperature is increased to about 1000° to 1400° C. Similar carbon yields (char yields) are evident with organic resin binders. This loss of about 40 to 60 percent of the original binder as a result of its decomposition during carbonization of the composite structure results in voids being created producing a structure having a low density and reduced strength.

Various expedients have been employed in the prior art to avoid the formation of porosity after heat treating a combination of carbonaceous reinforcing material and a pitch or organic resin binder. One method, as discussed in the aforementioned "Handbook of Composites", is to apply pressure to the combination of the carbonaceous reinforcing material and the pitch binder throughout the carbonizing heat treatment in order to increase the carbon yield.

Another method, as also discussed in the "Handbook of Composites", is to impregnate the carbonized composite structure with the pitch or organic resin followed by an additional heat treatment, usually under pressure, to carbonize the impregnant and thereby attempt to fill any voids that were created by the initial carbonization step. Generally, at least two impregnations are used with each impregnation followed by a heat treatment under pressure.

These techniques, however, are not completely effective since voids caused by volatilization in the binder and/or impregnant are still created during the heat treatment steps.

In an effort to remedy this problem, the art has resorted to retaining the volatile components of the pitch so as to improve both the pitch yield as well as the carbon yield by polymerizing these volatile components with chemical reagents thereby forming higher molecular weight constituents which are not readily susceptible to volatilization at carbonization temperatures.

In U.S. Pat. No. 4,096,056, for example, tar precursors are heated while blowing an oxygen containing gas into the reactor to polymerize the volatile components and thereby produce higher yields. In German Patent No. 1,015,377, nitro-functional group-containing aromatic compounds are added to pitch in order to achieve the same results by polymerization with these nitro-functional groups. British Patent Application No. 2,045,798 also shows a process from preparing a pitch from a tar which process comprises mixing the tar with a nitrating agent.

In the "Chemistry of Carbonization" and the references disclosed therein set forth in *Carbon*, Vol. 20, No. 6, pp. 519–529 (1982), it is disclosed that sulfur has also been used extensively as an additive to increase carbon yield.

Generally, however, as the carbon yield increases, the theological characteristics of the pitch also suffer. Thus, the pitch must exhibit a viscosity which allows for its being appropriately used as a binder and/or impregnant at specific operating temperatures of various commercial processes. For example, in the manufacture of graphite electrodes, coal tar pitch binder is mixed with petroleum coke filler at about 150° to 170° C. and extruded into a green electrode at 100° to 130° C. Usually, the Mettler softening point is used as the rheological criterion for pitches. As used herein, the term, "softening point" refers to the temperature at which the viscosity of the pitch is reduced to the degree required by the Mettler softening point method of ASTM D 3104-75. Typical electrode pitch binders have Mettler softening points of about 100° to 120° C. Further polymerization can result in a pitch having a softening point of as much as 250° C. or more.

In addition to increasing the softening point, polymerization of precursor tars or pitches with a chemical reagent may also affect the graphitizability of the resulting polymerized pitch or resin. In an article entitled "Chemical Changes During the Mild Air Oxidation of Pitch" by J. B. Bart and I. C. Levis, set forth in *Carbon*, Vol. 16, pp. 439–444 (1978), it is taught that oxidation reactions may modify the structure of the pitch by developing a network of cross-links between the molecules, thereby leading to the formation of disordered carbon structures which may prevent graphitization. In the aforementioned "Chemistry of Carbonization", it is taught that high sulfur addition may also result in the carbon being non-graphitizing. In U.S. Pat. No. 4,066,737, which is directed to a method for making isotropic carbon fibers, it is disclosed that carbonization of highly cross-linked macromolecular structures containing oxygen, nitrogen or sulfur, form rigidly cross-linked aromatic planes which prevent further conversion to a graphite structure. Finally, in the *Journal of Materials Science*, Vol. 18, pp. 3161–3176 (1983) in an article entitled "Review—Science and Technology of Graphite Manufacture" by S. Ragan and H. Marsh, it is disclosed that while the addition of sulfur or nitro-aromatic compounds may increase the carbon yield of a pitch binder upon baking, such addition, however, may adversely effect the graphitizability of the binder.

The need to have good graphitizability of a binder in the production of a carbon-carbon composite, particularly a graphite electrode, has long been well accepted. Good graphitizability has been correlated with desirable electrical and thermal properties in the resulting composite structure, particularly graphite electrodes.

In the Ragan and Harsh article, it is taught that binders used in the manufacture of electrode and graphite products need to fulfill various specifications. One such specification is the ability of the binder to produce a graphitized binder coke so as to improve electrical and thermal properties. The need to produce a binder coke that can be graphitized is once again taught in a section entitled "Carbon and Artificial Graphite" of the *Kirk-Othmer: Encyclopedia of Chemical Technology*, Vol. 4, Third Edition, pp. 156–631 (1978).

The need for graphitization also carries over to the reinforcing material. In an article entitled "Here is What's New in Delayed Coking" appearing in the *Journal of Oil and Gas*, 68:92–6 (1970) by A. Kutler, et al., it is taught that an easily graphitized coking material is desirable for it produces the qualities of low porosity, good conductivity and low coefficient of thermal expansion. This teaching is again repeated in a book entitled *Recent Carbon Technology* edited by T. Ishikawa and T. Nagaoki (I. C. Lewis as the English editor), JEC Press Inc. (1983), pp. 31–34.

A low coefficient of thermal expansion is extremely important in carbon-carbon composites, especially graphite electrodes. In addition to being directly indicative of the amount of thermal expansion exhibited by the carbon-carbon composite, the coefficient of thermal expansion is also indicative of many other properties as well. For example, both graphite and carbon electrodes undergo extreme thermal shock in their use in open-arc furnaces and submerged-arc furnaces, respectively. An electrode having a low coefficient of thermal expansion has a high resistance to such thermal shock. Moreover, a low coefficient of thermal expansion is also indicative of less breakage, less consumption, as well as low electrical resistance. In carbon-carbon composites other than electrodes, a low coefficient of thermal expansion may be necessary for applications in which a close tolerance in the overall dimensions of the composite structure is required.

SUMMARY OF THE INVENTION

Applicants have discovered a new carbon-carbon composite structure which avoids substantially all of the disadvantages and problems associated with the prior art structures discussed above.

Applicants' composite structure utilizes a particular pitch as a matrix material to act as a binder and/or an impregnant. The pitch is provided in a high pitch yield, produces a high carbon yield upon carbonization and provides increased flexural strength to the resulting carbon-carbon composite structure. Moreover, the softening point of the pitch can also be controlled such that a particular softening point for a specific application can be obtained.

Most importantly, however, the pitch, when used in a carbon-carbon-composite structure, particularly graphite electrodes, actually improves the electrical and thermal properties thereof.

Quite surprisingly and totally unexpectedly, the specific pitch which is able to produce all of the aforementioned results is a pitch whose aromatic components have been polymerized and cross-linked to such an extent that it is poorly graphitizable or even totally non-graphitizable (i.e., forms glassy carbon). As used herein, the phrases "poorly graphitizable pitch" or "poorly graphitizing pitch" is meant to include a pitch which may be totally non-graphitizable, and is a cross-linked pitch, which when subjected to mesophase formation conditions, will form mesophase pitch having a domain size of less than about 30μ or will form substantially no mesophase pitch at all if the pitch is totally non-graphitizable. When subjected to graphitization conditions, such a cross-linked pitch will form carbon layers having an inter-layer spacing of greater than about 3.38 Å as determined by X-ray diffraction.

In complete contrast to what would be predicted by one skilled in the art, based on the prior art literature discussed above, Applicants have discovered that a carbon-carbon composite structure containing a poorly graphitizing pitch as a binder and/or an impregnant actually reduces the coefficient of thermal expansion of the resulting structure. This discovery was made despite the clear teachings in the prior art that a pitch binder must be highly graphitizable in order to obtain good thermal and electrical properties.

More particularly, Applicants' unitary composite structure comprises a heterogeneous combination of a carbonaceous reinforcing material interbonded with a matrix material, said matrix material being a poorly graphitizing carbonaceous pitch containing aromatic components which have been chemically polymerized and cross-linked, wherein the structure has a lower coefficient of thermal expansion and a higher flexural strength than the same structure prepared with the same pitch whose aromatic components have not been cross-linked to the same extent. As used herein, it is to be understood that the phrase, "have not been cross-linked to the same extent" is meant to include a pitch whose aromatic components have not been cross-linked at all.

In a preferred embodiment, in order to control the softening point of the poorly graphitizing pitch, the pitch or its precursor is polymerized and cross-linked to the extent that poor graphitizability is obtained and then extracted and/or distilled to remove any low molecular weight components which may have not as yet been polymerized. In another embodiment, the poorly graphitizing pitch may be admixed with a conventional, non-treated pitch resulting in a combined pitch having a lower softening point but still possessing the characteristics desired so as to impart improved flexural strength and a reduced coefficient of thermal expansion to a carbon-carbon composite structure made with a such combined pitch.

Applicants have discovered that a high degree of graphitizability, particularly in the pitch, is in fact not the panacea for obtaining desirable properties in a carbon-carbon composite structure. Indeed, Applicants have discovered that improved flexural strength and a reduced coefficient of thermal expansion in a carbon-carbon composite structure, particularly graphite electrodes, are obtained when the binder and/or impregnant employed is actually poorly graphitizing, or even more preferably, completely non-graphitizable.

Accordingly, the present invention makes it possible to obtain a carbon-carbon composite structure utilizing a pitch which provides a high carbon yield and density and at the same time increases the flexural strength and reduces the coefficient of thermal expansion of such composite structure.

DETAILED DESCRIPTION OF THE INVENTION

The poorly graphitizing pitches used in the carbon-carbon composite structure of the present invention are derived from either a tar precursor or, alternatively, a pitch made from such a tar precursor.

The tars which may be employed as the starting material for preparing these pitches include aromatic liquid oil or tar products from petroleum and coal refining. Illustrative of such tars are pyrolysis tars from ethylene processes, pyrolysis tar distillates, decant oils from catalytic cracking, gas oils from petroleum refining and coking, and coal tars and coal tar distillates. Preferably, these tars should contain a high concentration of aromatics which are the reactive components to polymerization and cross-linking.

When the poorly graphitizing pitch is intended to be used in a process for preparing a carbon-carbon composite structure which does not require the pitch to have a low softening point, then a corresponding pitch of the above-noted tars may be used. Generally, the polymerization and cross-linking of a commercially available pitch will result in a pitch having a relatively higher softening point and higher carbon yield than that produced from a tar precursor. Typically, a cross-linked pitch made from a commercially available pitch will have a softening point in the range of about 200° to 400° C. and a carbon yield of about 60 to 90%. In contrast, a cross-linked pitch derived from a tar precursor will generally have a softening point in the range of about 90° to 150° C. and a carbon yield of about 40 to 65%.

The tar or pitch is treated with a cross-linking agent in accordance with the present invention such that its aromatic components are polymerized and cross-linked to form a disoriented, less-ordered carbon arrangement within the resulting pitch which significantly reduces its graphitizability. Generally, the extent of cross-linkage is indicative of the degree of graphitizability. The more cross-linked the pitch is, the more non-graphitizable it becomes until it reaches the point that it is completely non-graphitizing and forms glassy carbon.

As used herein, the term "graphitizability" is meant to indicate the capability of the pitch being converted thermally by heating to a temperature of about 3000° C., for a period of about 1 to 3 hours to a structure having the three-dimensional order characteristic of polycrystalline graphite.

The extent of graphitizability of a cross-linked pitch can be measured by a number of different ways. One way is to determine the amount of cross-linking agent that is bound to the aromatic components of the cross-linked pitch. The degree of graphitizability, as will be discussed more fully below, will depend upon the amount and type of cross-linking agent present in the pitch as well as the particular type of pitch precursor.

In another and more preferred method, a sample of the cross-linked pitch is subjected to conditions well known in the art which ordinarily will form mesophase pitch in the sample. The degree of cross-linking is directly related to the mesophase domain size. Applicants have determined that if the domain size of mesophase pitch which does form is less than 30μ, and preferably less than about 10μ, then the treated pitch has been polymerized and cross-linked to the extent desired. Most preferably, however, the treated pitch will have been cross-linked to such an extent that it will form mesophase pitch having a domain size of less than about 5μ or form no mesophase pitch at all to insure that there will be a reduction in the coefficient of thermal expansion of a unitary composite structure made with such a cross-linked pitch.

The transformation of pitch into mesophase pitch is well known and is discussed in, for example, "Mesophase Microstructures in Carbonized Coal Tar Pitch" by J. R. White, G. L. Guthrie, and J. O. Gardner, Carbon 5, 517 (1968) and in U.S. Pat. Nos. 4,005,183, 4,032,430, 3,976,729 and 4,303,631.

Generally, pitch is transformed into mesophase pitch by subjecting the pitch to a heat treatment under quiescent conditions at a temperature of about 350° to about 500° C. in an inert atmosphere of nitrogen, argon, xenon, helium, or the like. On heating, small insoluble liquid spheres appear in the pitch which gradually increase in size as heating is continued. When examined by electron diffraction and polarized light techniques, these spheres are shown to consist of layers of oriented molecules aligned in the same direction. As these spheres continue to grow in size as heating is continued, they come in contact with one another and gradually coalesce with each other to produce large masses of aligned layers. As coalescence continues, domains of aligned molecules much larger than the original spheres are formed. These domains come together to form a bulk mesophase wherein the transition from one oriented domain to another sometimes occurs smoothly and continuously through gradually curving lamellae and sometimes through more sharply curving lamellae.

The determination of the domain size in any mesophase pitch that may develop in the cross-linked pitch is discussed in an article entitled "Quantitative Determination of Anisotropic Domain Size in Mesophase Pitch" by R. T. Lewis, I. C. Lewis, R. A. Greinke, and S. L. Strong appearing in Extended Abstracts and Program, 17th Biennial Conference on Carbon, Lexington, Ky., Jun. 16–21, 1985, pg 340 and is incorporated herein by reference including the references cited therein.

It is not necessary, however, that a separate heat treatment step be carried out on the pitch, as described above, in order to form mesophase pitch. Mesophase pitch may form simply by passing through the above noted temperature range as the cross-linked pitch is heated to carbonization temperatures or higher, alone or in combination with carbonaceous reinforcing material in a composite structure.

Cross-linked pitch which forms mesophase pitch having a domain size of less than about 30μ will form carbon layers having an inter-layer spacing of about 3.38 Å after having been subjected to graphitization conditions. If there is no mesophase pitch found, then the cross-linked pitch will generally form glassy carbon upon subsequent graphitization having an inter-layer spacing of about 3.40 to 3.44 Å. By comparison, perfect polycrystalline graphite has an inter-layer spacing of 3.354 Å and highly graphitizable pitch will form mesophase pitch having a domain size of no less than about 50μ and usually about 100 to 200μ.

In yet another method for determining the extent of graphitizability in a cross-linked pitch, the pitch is actually subjected to graphitization conditions and then, by means of X-ray diffraction analysis, the inter-layer spacing between the resulting carbon layers is measured. Such an analysis of carbonaceous materials is well known and is discussed in, for example, "Chemical Structure and Graphitization: X-Ray Diffraction Studies of Graphites Derived From Polynuclear Aromatics", Carbon 7, 85 (1969) by T. Edstrom and I. C. Lewis, incorporated herein by reference.

Generally, the graphitized samples are first ground such that they pass through a 100 mesh Tyler screen. They are then mounted on a 5 ml thick tantalum fiber which has been dipped in a high temperature grease, e.g., Apiezon grease (commercially available from Associated Electrical Industries, Ltd.). The function of the grease is to permit the graphite particles to adhere to the tantalum fiber. The use of tantalum permits the accurate measurement of the 002, 004, 006 and 008 reflections in the graphite. Tantalum additionally provides distinct lines in back-reflection for photographic film shrinkage corrections.

The X-ray patterns are measured on photographic films with the use of a diffractometer, such as a Norelco diffractometer, and a powder camera, such as a Debye-Scherer powder camera. 144–6 mm diameter copper radiation and a nickel filter are employed, and the films are exposed for a period of 20 hours. Each film is measured and corrected for shrinkage. A second correction for the thickness of the tantalum fiber mount is also necessary to eliminate systematic error between results calculated from the 008, 006, 004, and 002 reflections.

The inter-layer spacing should be greater than about 3.38 Å and preferably greater than about 3.40 Å in order to realize improved flexural strength and a reduced coefficient of thermal expansion in a carbon-carbon composite made with such a cross-linked pitch as a binder and/or an impregnant. The inter-layer spacing will generally not be greater than about 3.44 Å which is recognized as being the maximum spacing for any carbon structure which has been graphitized to a temperature of 3000° C.

The tar or its corresponding pitch may be polymerized and cross-linked using any one or a combination of applicable cross-linking agents.

Suitable cross-linking agents include nitrating agents, elemental sulfur, oxygen, Lewis acids, halogens, strong oxidizing agents, and the like.

Such cross-linking agents may actually interact with the aromatic components of the tar or pitch and become part of the resulting polymerized and cross-linked pitch. Alternatively, they may simply act as a catalyst for the polymerization and cross-linking reactions of the aromatic components and do not become incorporated into the resulting cross-linked pitch.

Upon treating the tar or pitch by intimate contacting with one or more of these cross-linking agents, the tar or pitch change in character to form the poorly graphitizing pitch used in the present invention. By controlling the time, temperature and the amount of cross-linking agent for a particular tar or pitch precursor, the degree of cross-linking can be regulated. Usually, the extent of graphitizability of a pitch is a function of the degree of its cross-linking. If the cross-linking agent introduces elements other than carbon into the pitch, then excessive cross-linking may result in a lower carbon yield if the carbon-carbon composite structure containing such pitch is subsequently heated to high temperatures such as above 1200° C. Otherwise, once the extent of non-graphitizability has been obtained, further cross-linking is possible but would not be economically desirable. So too, excessive cross-linkage may also raise the softening point of the pitch to a value which may not be desirable for particular applications. On the other hand, insufficient cross-linking may result in a treated pitch which is still highly graphitizable or, alternatively, produces a low carbon yield.

Illustrative of the nitrating agents which may be employed in the process of this invention are nitric acid, a mixture of nitric acid and sulfuric acid, anhydrides of nitric acid such as acetyl and benzoyl nitrate, mixtures of alkali nitrates and sulfuric acid, nitric esters such as ethyl nitrate, $N_2O_5$ or $N_2O_4$ with sulfuric acid, $NO_2Cl$, and the like. When nitric acid is employed, it may be utilized in aqueous solutions having concentrations of greater than about 20 percent by weight of nitric acid. When a mixture of aqueous solutions of nitric acid and sulfuric acid is employed, the nitric acid is present in concentrations greater than about 25 percent by weight and the sulfuric acid is present in concentrations greater than about 30 percent by weight. Preferably, the ratio of nitric acid to sulfuric acid is 2:1 by volume.

Typically, when using nitric acid as the nitrating agent, for example, the liquid tar precursor solid pitch is stirred with the nitric acid at room temperature. After the desired extent of reaction has been achieved, the solid pitch product can be separated by decantation of the acid or by simple filtration. The process may also be carried out continuously by spraying the tar precursor feed into a nitrating agent solution and continuously separating the more dense product from the bottom of the reactor.

For other nitrating agents, nitration of the tar or pitch precursors may be carried out by methods which are well known to those skilled in the art.

This cross-linking process may produce pitch yields in excess of 100% based on the weight of the starting material inasmuch as a portion of the nitrating agent is incorporated into the pitch that is produced. The resulting pitch is then dried at a temperature above its melting point in order to drive off residual water. Such drying may preferably be accomplished with air or in a vacuum.

The extent of nitration can periodically be determined by means well known to those skilled in the art, e.g., by measuring the nitrogen content of the pitch by elemental analysis or by the use of quantitative infrared spectroscopy. The extent of reaction should be controlled such that the amount of nitrogen present in the form of nitro-functional groups bound to the aromatic rings of the treated pitch be about 3% to about 12% by weight and preferably about 5% to about 10% by weight.

At least about 5% by weight of nitrogen in the treated pitch is needed in order to reduce the coefficient of thermal expansion of a composite structure made with such a cross-linked pitch. This amount of nitrogen will generally result in the formation of glassy carbon, i.e., an inter-layer spacing of 3.40 to 3.44 Å, when the treated pitch is subjected to graphitization conditions. Although nitration beyond 12% by weight is possible and would still produce the desired results of the present invention, it is unnecessary to do so and economically undesirable.

The desired extent of nitration can be achieved by using a ratio of about 0.08 to 0.30 moles of nitrating agent per gram of pitch and preferably about 0.12 to 0.20 moles of nitrating agent per gram of pitch. When concentrated nitric acid (70%) is used as the nitrating agent, then about 10 ml of acid per gram of pitch and a reaction time of 3 hours at 25° C. will usually result in a cross-linked pitch containing about 5.5% nitrogen. Treatment for longer periods of time, up to 6 hours, will generally increase the nitrogen content to about 10%.

When using elemental sulfur as a cross-linking agent, the tar or pitch is mixed with sulfur in a ratio of about 0.0015 to 0.0075 moles of sulfur per gram of tar (pitch) and more preferably about 0.003 to 0.005 moles of sulfur per gram of tar (pitch). This mixture is then heated at a temperature of about 150° to 350° C. for about 1 to 5 hours. The sulfur/tar (pitch) ratio controls the extent of reaction and the degree of graphitizability.

In order to achieve the desired degree of poor graphitizability, applicants have determined that about 1.3% to about 12% by weight of sulfur should be present and cross-linked to the aromatic rings of the resulting polymerized and cross-linked pitch, the amount varying depending upon the particular precursor being treated.

With a sulfur content of about 1.3 to 5% by weight, the cross-linked pitch will generally form a mesophase pitch having a domain size of about 5 to 30μ resulting in a composite structure made with such a cross-linked pitch to have increased flexural strength as compared to a similar structure made with conventional, untreated pitch. If the sulfur content is greater than about 5% by weight, then the cross-linked pitch will usually form no mesophase at all (i.e., is totally non-graphitizable and forms glassy carbon upon graphitization) and will also reduce the coefficient of thermal expansion of a composite structure made with such a pitch.

When polymerizing and cross-linking the tar or pitch with oxygen, air, ozone or a combination thereof is bubbled through the tar or molten pitch, preferably while stirring at a temperature of about 200° to 350° C. and preferably about 250° to 300° C. for a period of about 1 to 10 hours and preferably about 1 to 4 hours, depending upon the specific starting material. While temperatures below 200° C. may be used, if so desired, the oxidation reaction proceeds at a very slow rate at such low temperatures. Above 350° C., excessive distillation of the volatile components may occur and there is even a danger of combustion. The parameters of temperature and time are interrelated so that the same extent of oxidation can be achieved with a high temperature and short time or, alternatively, low temperature and longer time.

Generally, air or oxygen is introduced into the tar or pitch starting material at a rate of about 0.0014 to 0.06 standard cubic meters per hour (SCMH) or more for about 50 grams of the starting material.

Preferably, the resulting polymerized and cross-linked, poorly graphitizing pitch prepared using oxygen as a cross-linking agent has about 2% to about 12% by weight of oxygen bound to the aromatic rings of the pitch and more preferably greater than about 4% by weight in order to obtain the degree of poor graphitizability which applicants have determined produce the desired results of the present invention.

Lewis acids are capable of inducing aromatic polymerization and cross-linking in the tar and/or pitch starting materials. The Lewis acids themselves are not incorporated into the final cross-linked pitch.

Aside from $AlCl_3$, which will not work, all of the conventionally acceptable Lewis acids are applicable in the present invention and include metal halides such as $FeCl_3$, $SnCl_2$, $SnCl_4$, $FeBr_3$, $ZnCl_2$, $SbCl_3$, $SbCl_5$, $CoCl_2$, $BF_3$, combinations thereof, and the like. Other Lewis acids, which are well-known in the art, can also be employed.

In preparing the poorly graphitizing pitch, the Lewis acid is admixed with the tar or pitch in a ratio of 0.0005 to 0.006 moles of Lewis acid per gram tar (pitch) and preferably about 0.002 to 0.004 moles of Lewis acid per gram of tar or pitch to help insure the reduction of the coefficient of thermal expansion in a carbon-carbon composite using such a cross-linked pitch. The mixture is then heated at a temperature of from about 100° to 300° C. with stirring for a period of about 1 to 6 hours. A non-reactive solvent with a boiling point of at least 100° C. or more, such as, chlorobenzene, trichlorobenzene, nitrobenzene, etc., can be employed with the Lewis acid if it is a solid. On the other hand, if the Lewis acid is a liquid, for example, $SbCl_5$, then the pitch or tar can be stirred directly with such a Lewis acid. With very reactive Lewis acids such as $SbCl_5$, the polymerization and cross-linking can be achieved at a temperature below 100° C., preferably near room temperature.

In a preferred embodiment, the Lewis acid can be admixed with an alkali metal halide such as KCl, NaCl, KBr, CsCl, etc., to form a low melting eutectic where this eutectic can serve as the liquid reaction medium.

After the reaction has been carried out to the extent desired, it is preferable to remove the components of the Lewis acid inasmuch as they may be characterized as impurities and will not contribute to the carbon yield of the resulting pitch. Accordingly, the reacted mixture is treated with water and if desired, water with hydrochloric acid, to remove the Lewis acid components which are soluble therein. After separation of the product by filtration, the pitch product is dried in vacuum.

Other cross-linking agents which are applicable herein include halogens such as chlorine, bromine, iodine, and the like, as well as strong oxidizing agents such as peroxide, permanganates, persulfates, chlorate salts, and the like. Still additional cross-linking agents can readily be determined by those skilled in the art.

In a preferred embodiment, after the tar or pitch has been polymerized and cross-linked to the extent necessary to provide the poor graphitizability required by the present invention, the carbon yield of this treated poorly graphitizing pitch can further be improved by subjecting the cross-linked pitch to a subsequent distillation and/or extraction step.

In the distillation step, a high vacuum, generally about less than 10 mm of mercury, and temperatures of 350° C. or below (in order to avoid the formation of mesophase) are employed.

The cross-linked pitch is distilled with agitation which may be achieved by introducing an inert gas through the molten pitch.

In the alternative extraction process, a series of solvents with varying degrees of dissolving capability is used. The cross-linked pitch is sequentially dissolved in various solvents thereby removing low molecular weight components which have not polymerized. Solvents which are applicable for such an extraction step include, but are not limited to, methyl alcohol/petroleum ether, petroleum ether, petroleum ether/toluene, toluene, and the like. Such solvents are well known to those skilled in the art and other applicable solvents can equally be employed.

In still another embodiment of the present invention, a cross-linked, poorly graphitizing pitch prepared in accordance with the present invention which may possess a softening point which is higher than that desired may be admixed with an untreated pitch having a low softening point such that the resulting mixture provides a pitch which is still substantially poorly graphitizing but which, now has a reduced softening point. Generally, when so admixing a cross-linked pitch with an untreated pitch, the amount of untreated pitch present in the resulting mixture should be no more that about 90% by weight and preferably no more than about 75% by weight in order to retain the poorly graphitizing characteristic of the resulting mixed pitch.

As an example, a cross-linked pitch made by air oxidation having a softening point of 200° C. can be admixed with a coal tar pitch having a softening point of 110° C. to result in a mixture containing 60% by weight of the untreated pitch having a softening point of 160° C. which pitch still possesses the required poor graphitizability to provide increased flexural strength and reduced coefficient of thermal expansion in a composite structure using this pitch admixture.

The preparation of such admixed pitch is especially desirable when employing a poorly graphitizing, nitrated pitch. Generally, a nitrated pitch undergoes a highly exothermic reaction during carbonization. In order to control this reaction, the nitrated pitch is admixed with an untreated pitch wherein the resulting heat of reaction is reduced upon subsequent carbonization.

Even when only 12.5% by weight of a nitrated pitch having a softening point of 100° C. is admixed with a coal tar pitch having a softening point of 110° C., the resulting admixture still results in a poorly graphitizing pitch which provides the desired properties of the present invention.

Once the cross-linked pitch having the necessary degree of poor graphitizability is provided, it is ready to be combined with the carbonaceous reinforcing material to form the ultimate carbon-carbon composite.

The carbonaceous reinforcing materials that are applicable in the present invention are substantially thermoplastically non-deformable for temperatures less than 1000° C. and include carbon or graphite fibers, petroleum coke, natural graphite, carbon black, anthracite, and the like.

The fibers may be derived from various precursor materials such as isotropic pitch, mesophase pitch, polyacrylonitrile, etc. Suitable fibers include commercially available fibers which generally have an average diameter in the range of from about 5 to about 15μ.

The fibers used for the carbonaceous reinforcing material may be woven, non-woven, knitted, structured, wound on a form such as a mandrel or the like, or aligned. In addition, the fibers may be used as "chopped fibers" to fill the matrix material. As used in the art, "chopped fibers" are short links of carbon or graphite fibers usually having an average length of about 1 to about 8 mm. Such chopped fibers are produced by methods well known in the art.

Carbon particles such as petroleum coke, natural graphite, etc., can be used alone as the reinforcing material such as in the manufacture of graphite electrodes. Alternatively, such carbon particles may be used in conjunction with the carbon or graphite fibers as a filler material. The poorly graphitizing matrix pitch material is combined with the carbonaceous reinforcing material in any conventional manner which is well known to those skilled in the art.

Depending upon the particular end use of the unitary, carbon-carbon composite structure being prepared, chopped graphite or carbon fibers may, for example, simply be mixed with the matrix pitch material while in its molten state and then compression molded or extruded into a desired shape or form. Alternatively, a woven or knitted fabric or non-woven fabric of carbon fibers may be shaped by means well known in the art and the matrix pitch material is then applied to the shaped reinforcing material in any suitable manner such as by spraying, dipping, and the like. Any conventional method for preparing the composite structure may be employed such as those disclosed in U.S. Pat. No. 4,131,708, which is incorporated herein by reference.

In the preparation of a graphite electrode, a calcined coke filler, derived from either petroleum or coal, is mixed with molten matrix material and is then formed into the desired shape by either extrusion or molding.

Where the carbonaceous reinforcing material does not have sufficient integrity of its own, such as chopped fibers, the initial function of the matrix pitch material is to act as a binder and uniformly disperse such a filler and allow the desired article to be formed. In the finished carbon-carbon composite product, the binder acts as the means by which the fibers are interbonded to one another and to the matrix material. In the case of a reinforcing material which has structural integrity, such as a woven fabric comprised of carbon fibers, the binder assists in allowing the desired article to be formed and also interbonds with such reinforcing material in the resulting product.

After being formed, the combination of reinforcing material and matrix material is then subjected to carbonization conditions so as to form the interbonded, unitary composite structure. As a result of this carbonization, the matrix pitch material is converted to an essentially non-thermoplastically deformable state.

Usually, carbonization is effected at a temperature of about 900° C. to about 1500° C., preferably from about 1000° C. to 1400° C. Generally, residence times are from about 0.5 minute to about 3 hours, preferably from about 1 minute to about 1 hour. While more extended heating times can be employed, such residence times are uneconomical and, as a practical matter, there is no advantage in employing such long periods. Such a carbonization step is well known in the art.

After the initial carbonization step, it may be desirable to add additional matrix pitch material to the unitary, carbon-carbon composite structure, this time to act as an impregnant and fill any voids which may have been created during the carbonization step so as to increase the density and correspondingly increase the strength of the resulting product. After additional matrix material has been added to the composite structure, the structure is once again subjected to carbonization conditions. These steps may be repeated again and again as desired.

If desired, the resulting carbon-carbon composites may then be graphitized to produce articles such as electrodes, structural carbons and graphites, and the like, for various electro-mechanical applications. Graphitization conditions are well known to those skilled in the art and generally include subjecting the composite to a temperature of from about 2600° C. to about 3000° C. for a time period from about 0.5 to 20 hours. With well graphitizing filler materials, this heat treatment will convert the carbonaceous reinforcing material in the composite structure to polycrystalline graphite. However, the cross-linked matrix pitch material, which is only poorly graphitizing, will form carbon layers having an inter-layer spacing of greater than about 3.38μ.

The unitary composite structure comprising a heterogeneous combination of carbonaceous reinforcing material interbonded with a matrix material which is a poorly graphitizing, cross-linked carbonaceous pitch has a higher flexural strength when compared to the same structure prepared in the same way using the same constituents with the only exception being that the pitch is one which has not been cross-linked at all or cross-linked to the extent required by the present invention. Indeed, even if the pitch which is not cross-linked is treated by physically distilling or extracting it such that volatiles are removed and its carbon yield increased to the point that it is equal to the carbon yield of the cross-linked pitch of the present invention, the flexural strength of a composite structure made with such a physically treated pitch would generally still be less than the same structure made with the poorly graphitizing pitch. This is totally unexpected for it has been generally accepted in this art that pitches having the same carbon yield will usually provide composites of comparable flexural strengths. Applicants have found, however, that even if the carbon yields of the poorly graphitizing pitch and conventional pitch are the same, the flexural strength of a composite made with the poorly graphitizing pitch will generally be substantially higher.

Provided that the poorly graphitizing pitch has been cross-linked to the extent that it forms mesophase pitch having a domain size of less than 5μ or forms substantially no mesophase pitch (where the absence of mesophase pitch leads to the formation of glassy carbon upon being subjected to graphitization conditions), a composite structure made with such a cross-linked pitch will have a lower coefficient of thermal expansion than the same structure prepared in the same way with the only exception being the use of a pitch which has not been cross-linked to the extent required by the present invention.

Composite structures prepared in accordance with the present invention will have a flexural strength that is at least about 20 to 40% greater than composite structures made with a conventional, highly graphitizable pitch matrix, even if it has the same carbon yield. Similarly, the reduction in the coefficient of thermal expansion can be as much as about $0.2 \times 10^{-6}/°C.$ as compared to a composite structure made with a graphitizable pitch, regardless of its carbon yield.

In addition to improved flexural strength and a reduced coefficient of thermal expansion, the composite structures prepared in accordance with the present invention also have increased carbon yield, increased density and overall improvement in their thermal and electrical properties.

Having described the basic concepts of the this invention, the following Examples are set forth to illustrate the same. They are not, however, to be construed as limiting the invention in any manner.

Flexural strength measurements are carried out pursuant to ASTM Method C-651.

Coefficient of thermal expansion measurements are carried out on extruded graphite rods by means of the Lamb's roller technique, which is well known in the art. This method measures the difference in thermal expansion between two dissimilar materials. Generally, the test specimen is mounted in a frame parallel to a bar, known as the "unispan" bar, made of a different material. The teat specimen and unispan bar are firmly fixed to each other and the frame at one end, the other end of each being free. A rod attached to a mirror is placed between the test specimen and unispan bar near their free ends, in contact with each. A reticle and scale are mounted at a fixed distance from the expansion unit and are able to measure rotation of the mirror in response to the differential expansion of the unispan bar and the test specimen.

A precisely calibrated lampblack-based standard rod is mounted in place of the test specimen. The entire frame-unispan bar-lampblack rod assembly is heated through the temperature range of 30° C. to 100° C. As the assembly is heated through this range, the rod and mirror rotate due to the differential expansion of the unispan bar and lampblack rod. The difference in degree of rotation between 30° C. and 100° C. is measured, and from this the coefficient of thermal expansion of the bar is determined. The process is repeated with the test specimen in place of the lampblack rod and with the unispan bar serving as the standard. The coefficient of thermal expansion of the test specimen is then determined by comparison with the unispan bar.

EXAMPLE 1

10 grams of a decant oil obtained from the catalytic cracking of gas oil, having an aromatic proton content of 37%, is stirred in a 400 ml beaker using a magnetic stirrer. 100 ml of 70% nitric acid aqueous solution is poured into the beaker and the mixture is then stirred at 25° C. for 3 hours.

The reacted mixture is filtered by being passed through a Buchner funnel which is maintained under a vacuum by the use of a water aspirator. The solid residue consisting of the nitrated pitch product remaining after filtration is then washed with about 50 ml of water and dried in a vacuum oven at 50° C. A solid nitrated pitch in a yield of 118%, based on the weight of the original oil, is obtained.

The polymerized and cross-linked pitch contains 5.4% by weight of nitrogen bound in the form of nitro-functional groups to the aromatic components of the pitch. Additionally, the pitch has a carbon yield (as measured by the modified Conradson carbon content test as described on page 521, Volume II of *Analytical Methods for Coal and Coal Products*, C. Carr, Jr., Academic Press (1978)) of 60% and a softening point (Mettler Softening Point) of 100° C.

The extent of graphitizability of this pitch is determined by subjecting a sample of the pitch to mesophase forming conditions. Approximately 2 grams of the pitch is placed in a porcelain container having dimensions of 12×12×75 mm. Aluminum foil is placed loosely over the top of the container to help reduce the escape of volatiles to minimize foaming. An aluminum holder surrounds the container for uniform heating. A metal sheathed thermocouple connected to the holder is used for measuring the temperature. The entire assembly is then inserted into a 3.5 cm diameter quartz tube which in turn is inserted into a 4 cm diameter tube furnace. The quartz tube is closed at both ends except for the provision of a 5 mm opening at each end to accommodate the introduction and release of an inert gas by means of a tube and access to the thermocouple. Nitrogen is introduced into the quartz tube at a flow rate of 0.0014 standard cubic meters per hour during the entire heat treatment. The tube furnace is then heated to a temperature of 400° C. and maintained at that temperature for 12 hours.

After the sample is allowed to cool to room temperature, it is then examined by polarized light microscopy. A specimen for microscopy is prepared by encapsulating pieces of the pitch in a ring mold with a liquid epoxy which is cured at room temperature. The specimen is,then polished by grinding with a Texmet (A. B. Buehler Corp.) disc charged with 3 µm sized alumina particles.

Inspection of the thusly treated sample by polarized light microscopy using a Bausch and Lomb metallographic polarized light microscope reveals that it is completely isotropic without the presence of any mesophase pitch. Consequently, it is determined that the decant oil has been polymerized and cross-linked with the nitrating agent to the desired extent of poor graphitizability.

The solid nitrated pitch is then blended with standard, solid commercially available coal tar pitch obtained from physical distillation of coal tar, having a softening point of 110° C. and a carbon yield of 60%, and a quinoline insoluble content of 12% by weight in a weight ratio of 1:1 using a 400 ml beaker and stirred with a glass stirring rod. The resulting admixture has a softening point of 100° C. and a carbon yield of 62%.

The blended pitch is then used as a binder to extrude a 19 mm diameter green electrode. The blended pitch matrix material is admixed with calcined petroleum coke in a ratio of 30 parts pitch to 100 parts coke by placing the coke into a hot oil jacketed 4 liter mixer preheated to 160° C. and then adding the blended pitch thereto. The admixture of coke and pitch is then mechanically stirred at a temperature of 160° C. for about 60 minutes. The admixture is then allowed to cool to about 100° C. and placed into a horizontal press-type extruder having a 19 mm diameter bore equipped with electrical heating elements. The extruder is evacuated and maintained at 120° C. The admixture is extruded from the extruder at a pressure of 21 kg/cm$^2$ to form a cylindrical rod 19 mm in diameter and 14 cm long. The rod is then baked by placing it in a sagger packed with calcined coke and heated at a rate of 3° C./hr to a temperature of 500° C., in an electrically heated furnace and then carbonized by heating at a rate of 10° C./hr to a temperature of 950° C., and finally graphitized by heating at a rate of 200° C./hr to a temperature of 3000° C. and held at 3000° C. for 2 hours in a high temperature electrically heated furnace.

After carbonization, a portion of the composite structure comprising the pitch binder and coke filler mix is examined by optical microscopy using polarized light and it is noted that the nitrated pitch portion of the structure produced a non-graphitized, glassy carbon which shows no anisotropy.

The characteristics of the graphitized structure for two separate trial runs are set forth in Table I below:

TABLE I

Properties of Graphite Electrode Made With 50% Nitrated Pitch/50% Coal Tar Pitch Binder

| | Density (g/cc) | Flexural Strength (kgs/cm$^2$) | Coeff. of Thermal Expansion (×10$^{-6}$/°C.) |
|---|---|---|---|
| Run 1a | 1.58 | 128.88 | 0.23 |
| Run 1b | 1.57 | 125.43 | 0.25 |

EXAMPLE 2

(Comparison Example)

For comparison, another graphite electrode is prepared in accordance with the procedure set forth in Example 1 using the exact same coke filler with the exception being that in this comparison example, the binder pitch consists entirely of the commercially available coal tar pitch which is used to make the blended pitch in Example 1. The nitrated pitch made in Example 1 is not used at all in this comparison example.

After carbonization of the green electrode, optical microscopy using polarized light on a portion of the carbonized electrode reveals that the carbonized coal tar pitch is highly graphitizable and exhibits large anisotropic domains.

The properties of the graphitized electrode are set forth in Table II below:

TABLE II

Properties of Graphite Electrode Made With 100% Coal Tar Pitch Binder

| Density (g/cc) | Flexural Strength (kgs/cm$^2$) | Coeff of Thermal Expansion (×10$^{-6}$/°C.) |
|---|---|---|
| 1.53 | 102.86 | 0.42 |

As is readily apparent, the graphite electrode of Example 1 made with the non-graphitizable pitch has a higher flexural strength and a reduced coefficient of thermal expansion than the graphite electrode made in this Example which is made from a conventional pitch binder. So too, the density in the graphite electrode containing the nitrated pitch was desirably greater.

EXAMPLE 3

Coal tar is polymerized and cross-linked with elemental sulfur in a number of different trials to form poorly graphitizing matrix pitch material. In the trials, the weight ratio of the tar to sulfur is varied in conjunction with the reaction time and temperature. Coal tar is placed in a 500 ml Resin flask to which the appropriate amount of sulfur is added. The flask is fitted with a reflux condenser, thermocouple, and a mechanical stirrer. The mixture is then heated with a heating mantle while stirring to the appropriate temperature and maintained at that temperature for the appropriate time. After allowing the reacted mixture to cool to room temperature, it is weighed and portions thereof subjected to various characterization tests. The mesophase domain size is determined by heating the pitch samples to 400° C. for 12 hours in the manner described in Example 1.

The results of these trials are set forth in Table III as follows:

EXAMPLE 5

Various commercially available pitches are polymerized and cross-linked with elemental sulfur at various weight ratios, reaction temperatures and residence times to produce high softening point pitches in the manner described in Example 3. The commercially available pitches treated include a coal tar pitch with a softening point of 108° C. containing a quinoline insoluble content of 15% and forms a mesophase pitch having a domain size of about 50–60 μ; a coal tar pitch with a softening point of 132° C. having no quinoline insoluble content and which forms a mesophase pitch having a domain size of about 150 to 200μ; and a petroleum pitch having no quinoline insolubles which forms a mesophase pitch having a domain size of about 150 to 200μ. The results of these trials are set forth in Table V below:

TABLE III

Coal Tar Cross-Linked With Sulfur

| Trial # | Tar/S Ratio | Temp. (°C.) | Time (hrs) | Pitch Yield (%) | Softening Point (°C.) | Carbon Yield (%) | S in Pitch (%) | Mesophase Domain Size (microns) |
|---|---|---|---|---|---|---|---|---|
| 3a | 10/1 | 230 | 1.0 | 82 | 96.5 | 49.8 | 4.5 | 1–5 |
| 3b | 10/1 | 250 | 1.0 | 79 | 116.3 | 52.8 | 4.2 | 1–5 |
| 3c | 6/1 | 230 | 1.0 | 82 | 130.4 | 58.9 | 9.5 | No mesophase (forms glassy carbon) |
| 3d | 5/1 | 220 | 1.0 | 89 | 94.2 | 55.4 | 12.6 | No mesophase (forms glassy carbon) |
| 3e | 5/1 | 230 | 1.0 | 82 | 144.0 | 61.0 | 12.0 | No mesophase (forms glassy carbon) |

As is seen, the more sulfur that is mixed with the tar precursor, the more non-graphitizable is the resulting pitch. However, excessive sulfur may detrimentally affect the carbon yield and increase the softening point beyond that which may be commercially acceptable for a particular application.

EXAMPLE 4

Example 3 is repeated with the exception that instead of coal tar, pyrolysis tar is used instead. The results of these trials are set forth in Table IV below:

TABLE IV

Pyrolysis Tar Cross-Linked With Sulfur

| Trial # | Tar/S Ratio | Temp. (°C.) | Time (hrs) | Pitch Yield (%) | Softening Point (°C.) | Carbon Yield (%) | S in Pitch (%) | Mesophase Domain Size (microns) |
|---|---|---|---|---|---|---|---|---|
| 4a | 10/1 | 220 | 1.0 | 88 | 90.1 | 35.0 | 1.2 | 1–5 |
| 4b | 10/1 | 250 | 1.0 | 85 | 91.6 | 36.0 | 1.3 | 1–5 |
| 4c | 10/1 | 300 | 1.0 | 77 | 96.3 | 41.0 | 1.5 | 1–5 |
| 4d | 7.5/1 | 250 | 1.0 | 82 | 118.2 | 40.8 | 3.1 | 1–5 |
| 4e | 5/1 | 200 | 1.5 | 87 | 105.4 | 44.9 | 10.4 | No mesophase (forms glassy carbon) |
| 4f | 5/1 | 220 | 1.0 | 81 | 168.3 | 48.6 | 6.5 | No mesophase (forms glassy carbon) |

TABLE V

Pitches Cross-Linked With Sulfur

| Trial # | Type of Pitch | Pitch/S Ratio | Temp. (°C.) | Time (hrs) | Pitch Yield (%) | Soft Point (°C.) | Carbon Yield (%) | S in Pitch (%) | Mesophase Domain Size (microns) |
| --- | --- | --- | --- | --- | --- | --- | --- | --- | --- |
| 5a | Coal Tar (S.P. = 108° C.) | 10/1 | 220 | 1.0 | 94 | 188 | 69.2 | 4.8 | 1–5 |
| 5b | Coal Tar (S.P. = 108° C.) | 10/1 | 300 | 1.0 | 81 | 275 | 75.0 | 5.0 | 1–5 |
| 5c | Coal Tar (S.P. = 108° C.) | 20/3 | 250 | 0.3 | 91 | 263 | 76.3 | 6.8 | no mesophase (forms glassy carbon) |
| 5d | Coal Tar (S.P. = 108° C.) | 4/1 | 220 | 1.0 | 93 | 191 | 77.5 | 15.1 | no mesophase (forms glassy carbon) |
| 5e | Coal Tar (S.P. = 132° C.) | 10/1 | 220 | 1.0 | 95 | 186 | 68.4 | 5.94 | 1–5 |
| 5f | Coal Tar (S.P. = 132° C.) | 20/3 | 293 | 0.1 | 90 | 306 | 76.0 | 5.5 | 1–5 |
| 5g | Coal Tar (S.P. = 132° C.) | 4/1 | 220 | 1.0 | 94 | 181 | 76.6 | 16.8 | no mesophase (forms glassy carbon) |
| 5h | Petroleum (S.P. = 120° C.) | 10/1 | 220 | 0.3 | 96 | 214 | 71.6 | 6.0 | 1–5 |
| 5i | Petroleum (S.P. = 120° C.) | 4/1 | 220 | 0.7 | 93 | 227 | 81.4 | 15.9 | no mesophase (forms glassy carbon) |

EXAMPLE 6

375 grams of a coal tar is heated with 37.5 grams of elemental sulfur at 250° C. for 2 hours with stirring in the same manner as described in Example 3. The resulting polymerized and cross-linked pitch product has an 82% pitch yield, based on the weight of the original coal tar, and has a softening point of 110° C. and a carbon yield of 49.8%.

A portion of the pitch is then heated to 400° C. for 12 hours to form mesophase in the same manner as described in Example 1. An examination of the mesophase formed shows that it has domains of about 2 microns in size thereby indicating the desired extent of non-graphitizability.

The matrix pitch material is then used as a binder to form a graphite electrode in the same manner as described in Example 1. The pitch is admixed with petroleum coke at a level of 30 parts pitch per 100 parts coke, extruded into the shape of a cylindrical rod, baked by heating at a rate of 3° C./hr to a temperature of 500° C., 10° C./hr to 950° C., then graphitized at a temperature of 3000° C. for 2 hours.

The graphitized rod has a coefficient of thermal expansion of $0.39 \times 10^{-6}$/°C.

EXAMPLE 6

(Comparison Example)

The graphitized rod of Example 5 is prepared once again, with the only exception that the pitch used as a binder is a conventional coal tar pitch having a softening point of 100° C. The coefficient of thermal expansion of this comparative graphite electrode is $0.45 \times 10^{-6}$/°C., an increase of 15.4%.

EXAMPLE 7

A coal tar distillate is polymerized and cross-linked by air oxidation by placing the coal tar distillate in a 500 ml Resin flask fitted with an air inlet tube, a mechanical stirrer, a distillation unit, and a thermocouple. Air is bubbled through the tar in an amount of 0.06 SCMH per 100 grams of tar while stirring and heating with a heating mantle to a temperature of 250° C. for a period of 4 hours.

A cross-linked, poorly graphitizing pitch is obtained having a softening point of 213° C. and a carbon yield of 60%.

This solid oxidized pitch is blended with a standard commercially available coal tar pitch which has a softening point of 110° C. and a carbon yield 60% in a weight ratio of 60% air blown pitch/40% standard pitch by mechanically stirring a melted mixture of the oxidized pitch and commercial pitch in a 400 ml aluminum container heated with a heating mantle at a temperature of 285° C. for ½ hour under a nitrogen blanket. The resulting blend has a softening point of 165° C. and a carbon yield of 60%.

A 19 mm graphite electrode is formed using the pitch blend as a matrix binder in accordance with the procedure described in Example 1 and is determined to have the characteristics set forth in Table VI below:

TABLE VI

Properties of Graphite Electrode Made With 60% Air-Blown Pitch/ 40% Coal Tar Pitch Binder

| Density (g/cc) | Flexural Strength (kgs/cm²) | Coeff of Thermal Expansion ($\times 10^{-6}$/°C.) |
| --- | --- | --- |
| 1.55 | 116.50 | 0.26 |

S.P. = 165° C.
MCC = 60%

EXAMPLE 8

(Comparison Example)

Example 7 is repeated with the only exception that instead of using the blended pitch, the matrix binder material is a standard coal tar pitch having a softening point of 110° C. and a carbon yield of 60%. After the graphite electrode is prepared using this coal tar pitch as a binder in accordance with the procedure described in Example 1, the following properties are obtained as set forth in Table VII below:

TABLE VII

Properties of Graphite Electrode Made
With 100% Coal Tar Pitch Binder

| Density (g/cc) | Flexural Strength (kgs/cm$^2$) | Coeff. of Thermal Expansion (×10$^{-6}$/°C.) |
| --- | --- | --- |
| 1.54 | 105.89 | 0.40 |

S.P. = 110° C.
M.C.C. = 60%

When comparing the graphite electrode prepared in Example 7 which is made in accordance with the present invention and the electrode made in this Example which has been made in accordance with the prior art, the flexural strength of the electrode of Example 7is increased whereas the coefficient of thermal expansion is desirably reduced.

EXAMPLE 9

Various precursors are treated with Lewis acids so as to form polymerized and cross-linked, poorly graphitizing pitches. The precursors are cross-linked by adding the appropriate amount of Lewis Acid to the appropriate amount of precursor in a 100 ml flask fitted with a reflux condenser, a thermometer, and a magnetic stirrer. The mixture is heated with a heating mantle while stirring to the appropriate temperature and for the appropriate time as indicated in Table VIII below. After cooling to room temperature, the mixture is added to 100 ml of concentrated hydrochloric acid contained in a 400 ml beaker and stirred with a magnetic stirrer for ½ hour. The mixture is then filtered through a Buchner funnel evacuated with a water aspirator. The solid, cross-linked pitch is then washed with 50 ml of water and re-filtered. The pitch is then dried in a vacuum oven at 50° C. for ½ hour. The conditions and results of the various trials are set forth in Table VIII as follows:

TABLE VIII

Pitches Made With Lewis Acids as Cross-Linking Agents

| Trial # | Precursor | Cross-Linking Agent | React. Temp. (°C.) | React. Time (hrs.) | Pitch Yield (%) |
| --- | --- | --- | --- | --- | --- |
| 11 a | Decant Oil (20 g) | SnCl$_4$ (10 g) | 110 | 2 | 95 |
| 11 b | Pyrolysis Tar (13.8 g) | ZnCl$_2$ (13.8 g) + Acetic Acid (50 ml) | 120 | 3 | 56 |
| 11 c | Pyrolysis Tar (10 g) [distilled to remove 370° C. distillate] | CuCl$_2$ (10 g) + ZnCl$_2$ (10 g) | 350 | 2 | 100 |
| 11 d | Pyrolysis Tar (5 g) [distilled to remove 370° C. distillate] | SbCl$_3$ (10 g) + NaCl (5 g) | 150 | 3 | 100 |
| 11 e | Pyrolysis Tar (5 g) [distilled to remove 370° C. distillate] | SbCl$_5$ (10 g) | 25 | 1 | 100 |
| 11 f | Pyrolysis Tar (5 g) [distilled to remove 370° C. distillate] | I$_2$ (2 g) | 160 | 2 | 100 |
| 11 g | Pyrolysis Tar Residue (10 g) | FeCl$_3$ (10 g) | 310 | 1.5 | 90 |

All of the cross-linked pitches are then subjected to conditions which favor the production of mesophase, particularly, heating these pitches at a temperature of 400° C. for 12 hours using the procedure described in Example 1. Polarized light microscopy shows that the pitches produced no mesophase at all or, alternatively, produced a mesophase having a domain size which is less than 20 m indicating that the resulting pitch is indeed cross-linked to the extent necessary to provide non-graphitizability.

EXAMPLE 10

A light coal tar distillate is heated for 2 hours at a temperature of 250° C. and then for 1 hour at a temperature of 275° C. while air is bubbled through the distillate at a flow rate of 0.06 SCMH per 50 grams of distillate using the procedure described in Example 7. A solid pitch product is obtained in a yield of 37%, based on the weight of the original tar distillate, a carbon yield of 38% and a softening point of 83° C.

A portion of the pitch is then subjected to mesophase forming conditions by heating the pitch at 400° C. for 12 hours in the manner described in Example 1. Examination by polarized light microscopy reveals that the pitch forms no mesophase and will therefore form glassy carbon when subjected to subsequent graphitization conditions.

The pitch is then distilled by placing the pitch in a ceramic container and heating the pitch under a nitrogen blanket at a temperature of 350° C. at atmospheric pressure in a tube furnace for a period of ½ hour.

The distilled pitch has a softening point of 297° C. and a carbon yield of 63%, a gain of about 65.7% in carbon yield as a result of the distillation step.

EXAMPLE 11

A coal tar distillate is polymerized and cross-linked by air oxidation by bubbling air through the distillate in an amount of 0.06 SCMH per 100 grams of distillate at a temperature of 250° C. for a time period of 4 hours in the same manner as described in Example 7. A poorly graphitizing, cross-linked pitch is obtained having a softening point of 213° C. which forms mesophase pitch having a domain size of about 1 to 10μ.

This pitch is impregnated into small specimens of a porous carbon fiber/carbon binder preform. The carbon preform specimens were obtained from a hollow cylinder of approximately 1.27 cm wall thickness, fabricated according to the following process:

a) Union Carbide Grade WCA graphite cloth is preimpregnated with a carbon-black filled phenolic resin, then heated to a tacky state.

b) The prereg is cut into thin strips which are laid in a "rosette pattern" over a cylindrical male mandrel. The strips are laid such that their longitudinal axis is parallel to the cylinder axis. One edge of each strip is in contact with the mandrel, i.e., starts at the inside diameter of the hollow cylinder preform, while the other edge is at the outside of the preform thereby forming the "rosette pattern" noted above.

c) The preform is then "debulked" by placing a plastic bag over the outside of the preform and evacuating the air from the preform material thereby compacting it.

d) The preform is then removed from the male mandrel and placed inside a female mandrel in preparation for curing.

e) The preform in the female mandrel is then completely encased in a plastic bag, placed in an autoclave and cured under 21 kgs/cm$^2$ at the curing temperature of the phenolic resin.

f) The cured preform composite is removed from the female mandrel and baked at 650° C.

g) The baked preform is cut into parallelepiped specimens each about 5.08 cm long, 2.54 cm wide and about 0.76 to 1.27 cm thick.

h) the specimens are then rebaked at 950° C. prior to impregnation.

The six preform samples are placed in an evacuatable steel retort and completely covered with 250 grams of the poorly graphitizing pitch by sprinkling the pitch in granular or powdered form over and around the samples such that the height of the granulated pitch is about 1.9 cm, which is about 1 cm above the surface of the parallelepiped composite blocks. The entire assembly is then placed in a Lindberg box furnace and heated at a heating rate of about 1.3° C./minute to a temperature of 305° C. in a vacuum of about 2 cm Hg. After reaching the temperature, 2 atmospheres of nitrogen are introduced into the retort and the assembly is held at that temperature for an additional 2.5 hours.

The furnace is then cooled to room temperature and after scraping off the excess pitch on the surfaces of the specimens, the impregnated preforms are weighed. It is determined that an average of about 24.1% by weight of pitch has been impregnated into each of the specimens.

The preforms are then baked in the Lindberg furnace, by heating at a rate of 0.5° C./minute to about 560° C. under 2 atmospheres of nitrogen and held at that temperature for 1 hour. By weighing the baked preforms, it is determined that carbon yield of the retained pitch is 71.7%. Accordingly, the baked preforms had picked up an average of 17.3% by weight of carbon (71.7%×24.1%).

The impregnated preforms are then carbonized in the Lindberg furnace by heating at a rate of 1° C./min to a temperature of 800° C. at which temperature it is held for 1 hour. The carbonized preforms have an average density of 1.32 g/cc and a flexural strength of 14,250 psi.

EXAMPLE 12

(Comparison Example)

For comparison purposes, six parallelepiped specimens are impregnated with petroleum pitch having a softening point of 120° C. 250 grams of powdered pitch is sprinkled onto the preform in the same manner as described in Example 11 and heated to 220° C. under a vacuum of 2 cm Hg. at a heating rate of about 1.5° C./minute and held at the temperature for 0.5 hour under vacuum as described in Example 11. Two atmospheres of nitrogen are then introduced and each of the samples heated for an additional 0.5 hour.

After cooling, it is determined that an average of about 21.3% by weight of pitch has been impregnated. The preforms are then baked in the same manner as in Example 11 by heating at a rate of 0.5° C./minute under 2 atmospheres of nitrogen to temperature of 555° C. and held at that temperature for 1 hour. The carbon yield of the impregnant pitch is determined to be 69.7% by weight. The net weight percent pick-up is 14.8% by weight (69.7%×21.3%).

The preforms are then carbonized by heating at a rate of 1° C./minute to a temperature of 800° C. and held at that temperature for 1 hour.

The resulting carbonized preforms had an average density of 1.32 g/cc and a flexural strength of 13,620 psi.

Thus, although the preforms in this comparison example and the preforms of Example 11 have the same density after carbonization, the average flexural strength of the preforms prepared with a conventional pitch is still less than the flexural strength of the composites prepared with poorly graphitizing pitch as an impregnant.

What is claimed is:

1. A process for the production of a unitary composite structure comprising a heterogeneous combination of carbonaceous reinforcing material interbonded with a matrix material comprising:

(a) providing the matrix material by treating a tar or a pitch having aromatic components with a cross-linking agent to polymerize and cross-link the aromatic components to the extent that the pitch becomes poorly graphitizing and forms substantially no mesophase pitch or forms mesophase pitch having a domain size of less than about 30μ;

(b) combining the poorly graphitizing matrix pitch material with reinforcing material; and then (c) subjecting the combination of reinforcing material and matrix material to carbonization conditions to form the interbonded unitary composite structure, wherein the tar or pitch is polymerized and cross-linked by being contacted with at least one Lewis acid selected from the group consisting of $FeCl_3$, $SnCl_2$, $SnCl_4$, $FeBr_3$, $I_2$, $ZnCl_2$, $SbCl_3$, $SbCl_5$, $CoCl_2$, $BF_3$ and combinations thereof.

2. The process of claim 1, wherein after polymerization and cross-linking, the Lewis acid components are removed by solvent extraction.

3. A unitary composite structure comprising a heterogeneous combination of a carbonaceous reinforcing material interbonded with a matrix material, said matrix material being a carbonaceous pitch cross-linked with oxygen containing polymerized and cross-linked aromatic components thereof which have been cross-linked to the extent that the pitch is poorly graphitizing and has formed substantially no mesophase pitch or contains mesophase pitch having a domain size of less than about 30μ.

4. The composite structure of claim 3, wherein the cross-linked pitch comprises between about 2% and 12% by weight of oxygen cross-linked with the pitch.

* * * * *